United States Patent
Hwang (10) Patent No.: US 10,013,104 B2
(45) Date of Patent: Jul. 3, 2018

(54) APPARATUS FOR DRIVING OF TOUCH PANEL AND ELECTRONIC DEVICE INCLUDING THE SAME

(71) Applicant: LG Display Co., Ltd., Seoul (KR)

(72) Inventor: JongHee Hwang, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 12 days.

(21) Appl. No.: 15/224,034

(22) Filed: Jul. 29, 2016

(65) Prior Publication Data

US 2017/0031504 A1 Feb. 2, 2017

(30) Foreign Application Priority Data

Jul. 31, 2015 (KR) ........................ 10-2015-0109159

(51) Int. Cl.
*G06F 3/041* (2006.01)
*G06F 3/0488* (2013.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 3/0488* (2013.01); *G06F 2203/04105* (2013.01)

(58) Field of Classification Search
CPC ...... G06F 3/0416; G06F 3/044; G06F 3/0412; G06F 3/0488; G06F 2203/04105
See application file for complete search history.

(56) References Cited

U.S. PATENT DOCUMENTS

| | | | |
|---|---|---|---|
| 2010/0149130 A1* | 6/2010 | Jung | G06F 3/0416 345/174 |
| 2012/0268411 A1* | 10/2012 | Chen | G06F 3/0416 345/174 |
| 2013/0321335 A1* | 12/2013 | Tokutake | G06F 3/044 345/174 |
| 2014/0198060 A1* | 7/2014 | Wu | G06F 3/0412 345/173 |
| 2014/0218334 A1* | 8/2014 | Shibata | G06F 3/044 345/174 |
| 2015/0123860 A1* | 5/2015 | Park | H01Q 1/526 343/720 |

* cited by examiner

*Primary Examiner* — Premal R Patel
(74) *Attorney, Agent, or Firm* — Birch, Stewart, Kolasch & Birch, LLP (57) ABSTRACT

An apparatus for driving a touch panel can include a touch panel for sensing a force touch of a user input, and a touch driver for sensing the force touch from the touch panel and generating touch force data, in which the touch driver adjusts a sensitivity of the touch force data, based on touch mode information set by the user.

19 Claims, 10 Drawing Sheets

APPARATUS FOR DRIVING OF TOUCH PANEL AND ELECTRONIC DEVICE INCLUDING THE SAME

CROSS-REFERENCE TO RELATED APPLICATIONS

This application claims the benefit of Patent Application No. 10-2015-0109159 filed in the Republic of Korea on Jul. 31, 2015, which is hereby incorporated by reference as if fully set forth herein.

BACKGROUND

Field of the Invention

The present invention relates to an apparatus for driving a touch panel sensing a force touch and a touch position and an electronic device including the same.

Discussion of the Related Art

Touch panels are used as input devices of various products such as televisions (TVs), notebook computers, monitors, etc., in addition to portable electronic devices such as electronic notebooks, e-books, portable multimedia players (PMPs), navigation devices, ultra-mobile personal computers (UMPCs), mobile phones, smartphones, tablet personal computers (PCs), watch phones, mobile communication terminals, etc.

Recently, as a user interface environment of applications requiring touch information about a force touch is established, electronic devices for sensing the force touch are being used.

In a related art touch panel for sensing a force touch, a force-sensing material is disposed between an upper electrode and a lower electrode, and thus, the force touch is sensed based on a distance change between the upper electrode and the lower electrode.

Generally, as a touch area is enlarged, the same force touch is not transferred to the lower electrode even when the same force is applied to the touch panel. Particularly, a touch input type of a user and a force touch angle of a user's finger can change. In this instance, as the force touch angle is reduced, a touch area is enlarged, and thus, even when the same touch force is applied to the touch panel, touch forces applied to respective unit areas differ depending on the force touch angle. In order to overcome such a limitation, a method of calculating an area touched by a soft touch to adjust touch sensitivity has been proposed. However, in the method, as a touch force increases, a touch area is enlarged even in a state where an initial touch area is small, and moreover, when a bit touch or a proximity touch is applied to the touch panel, a touched area cannot be distinguished from a touch area formed by a force touch.

For this reason, in the related art touch panel for sensing a force touch, it is difficult to accurately determine a force touch of a user. In order to solve such a problem, a complicated compensation algorithm is needed.

SUMMARY OF THE INVENTION

Accordingly, the present invention is directed to provide an apparatus for driving a touch panel and an electronic device including the same that substantially obviate one or more problems due to limitations and disadvantages of the related art.

An aspect of the present invention is directed to provide an apparatus for driving a touch panel and an electronic device including the same, which adjust a force sensing sensitivity.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an apparatus for driving a touch panel including a touch panel and a touch driver that senses a force touch from the touch panel to generate touch force data and adjusts a sensitivity of the touch force data, based on touch mode information set by a user. The touch mode information corresponds to one touch mode selected from among first to ith (where i is a natural number greater than or equal to two) touch modes which is set based on a force touch angle with respect to the touch panel.

In another aspect of the present invention, there is provided an electronic device including a housing including an image display module disposed in an accommodating space of a housing and a force sensor unit overlapping the image display module. The force sensor unit includes a touch driver that senses a force touch from the touch panel to generate touch force data and adjusts a sensitivity of the touch force data, based on touch mode information set by the user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

The terms described in the specification should be understood as follows. As used herein, the singular forms "a," "an" and "the" are intended to include the plural forms as well, unless the context clearly indicates otherwise. The terms "first" and "second" are for differentiating one element from the other element, and these elements should not be limited by these terms. It will be further understood that the terms "comprises," "comprising," "has," "having," "includes" and/or "including," when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of an apparatus for driving a touch panel and an electronic device including the same according to the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 1:
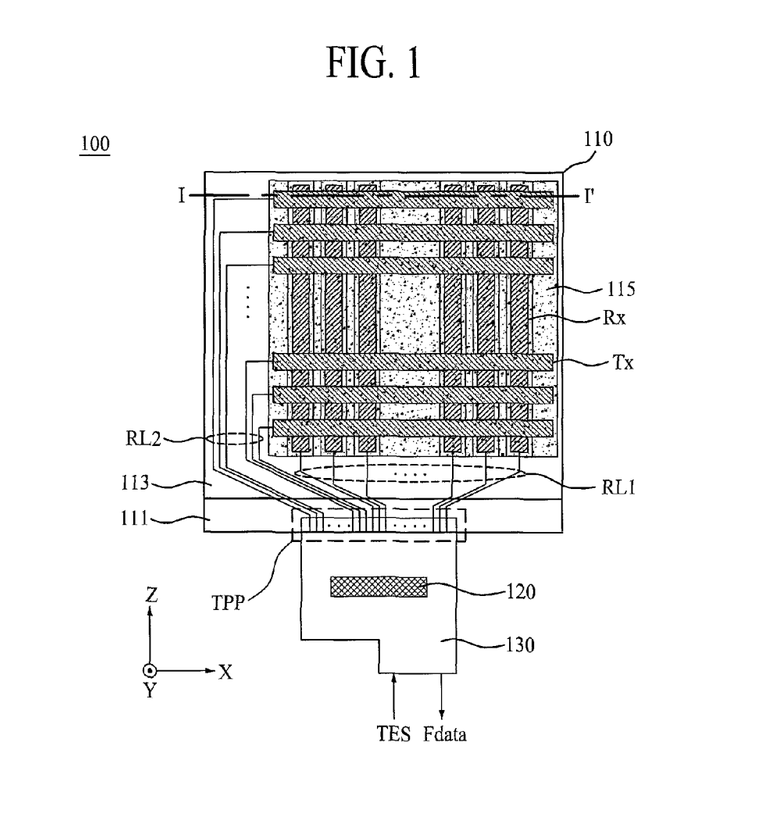
FIG. 1 is a diagram illustrating an apparatus for driving a touch panel, according to an embodiment of the present invention.
Figure 2:
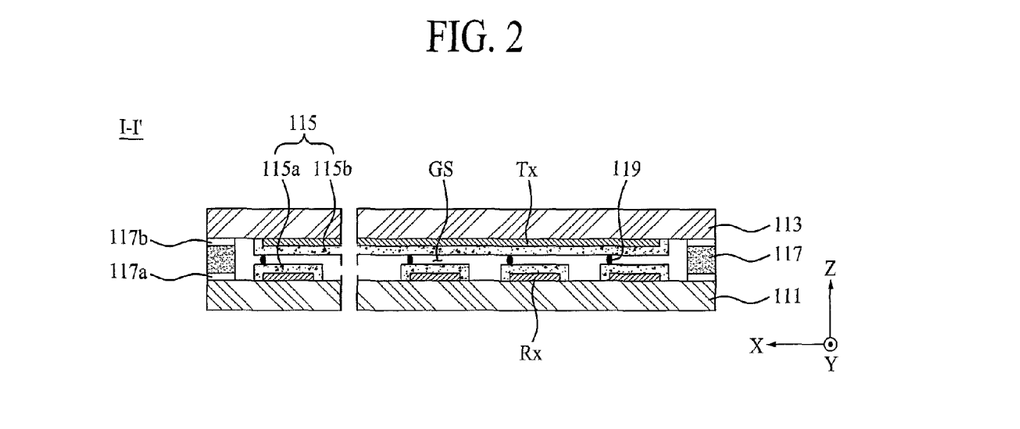
FIG. 2 is a cross-sectional view taken along line I-I' of FIG. 1.

FIG. 1 is a diagram illustrating a touch panel driving apparatus 100 according to an embodiment of the present invention, and FIG. 2 is a cross-sectional view taken along line I-I' of FIG. 1.

Referring to FIGS. 1 and 2, the touch panel driving apparatus 100 according to an embodiment of the present invention may include a touch panel 110 and a touch driver 120.

The touch panel 110 may sense a force touch of a user and may include a first substrate 111, a second substrate 113, a force sensor member 115, and a substrate bonding member 117.

The first substrate 111 may be formed of a transparent plastic material, for example, polyethyleneterephthalate (PET). The first substrate 111 may include a plurality of first electrodes Rx.

The plurality of first electrodes Rx may be provided in a bar type and may be arranged at certain intervals in parallel with a first direction X of the first substrate 111 and along a second direction Y intersecting the first direction X. Each of the plurality of first electrodes Rx may be connected to the touch driver 120 through a first routing line RL1 and may act as a sensing electrode for sensing a force touch.

The first substrate 111 may include a touch pad part TPP which is provided on one side of the first substrate 111. The touch pad part TPP may be connected to the touch driver 120.

The second substrate 113 may be formed of a transparent plastic material (for example, PET) which is the same as that of the first substrate 111. The second substrate 113 may include a plurality of second electrodes Tx.

The plurality of second electrodes Tx may be provided on a bottom of the second substrate 113 to intersect the plurality of first electrodes Rx and may be formed of a transparent conductive material. The plurality of second electrodes Tx may be provided in a bar type and may be arranged at certain intervals in parallel with the second direction Y of the first substrate 111 and along the first direction X. Each of the plurality of second electrodes Tx may be connected to the touch driver 120 through a second routing line RL2 and may act as a driving electrode for sensing the force touch.

The force sensor member 115 may be provided in an intersection portion of the first and second electrodes Rx and Tx. The force sensor member 115 may form a force sensor (i.e., a resistor Rm) in the intersection portion of the first and second electrodes Rx and Tx, based on the force touch of the user. The force sensor may have a resistance value which varies according to a contact area between the force sensor member 115 and the second electrode Tx based on the force touch (or a contact load) of the user applied to the second substrate 113, thereby enabling the force touch of the user to be sensed.

According to a first embodiment of the present invention, the force sensor member 115 may be provided on a top of the first substrate 111 to cover the plurality of first electrodes Rx. According to a second embodiment of the present invention, the force sensor member 115 may be provided on a rear surface of the second substrate 113 facing the first substrate 111 to cover the plurality of second electrodes Tx. According to the first and second embodiments, the force sensor member 115 may be provided as a single body and thus is suitable for sensing a single force touch.

According to a third embodiment of the present invention, the force sensor member 115 may include a plurality of first elastic resistor patterns 115a and a plurality of second elastic resistor patterns 115b.

The plurality of first elastic resistor patterns 115a may be provided on the top of the first substrate 111 to respectively cover the plurality of first electrodes Rx in a one-to-one correspondence relationship. That is, one first elastic resistor pattern 115a may be pattern-formed on the top of the first substrate 111 to cover one first electrode Rx.

The plurality of second elastic resistor patterns 115b may be provided on the bottom of the second substrate 113 facing the top of the first substrate 111 to respectively cover the plurality of second electrodes Tx in a one-to-one correspondence relationship. That is, one second elastic resistor pattern 115b may be pattern-formed on the bottom of the second substrate 113 to cover one second electrode Tx.

According to the third embodiment, the plurality of first elastic resistor patterns 115a may be separated from each other, and the plurality of second elastic resistor patterns 115b may be separated from each other. Accordingly, the force sensor member 115 according to the third embodiment is suitable for sensing a multi-force touch.

The force sensor member 115 may be formed of a piezo-resistive material or a pressure sensitive adhesive material based on one of quantum tunneling composites (QTC), electro-active polymer (EAP), acryl, and a rubber-based solvent. Here, the pressure sensitive adhesive material may have characteristic where a resistance varies according to an area. Also, the piezo-resistive material may have a piezo-resistive effect where when an external force is applied to a silicon semiconductor crystal, conduction energy is generated, and thus, an electric charge moves to a conduction band, whereby a resistivity varies. The piezo-resistive material may have characteristic where a variation of the resistivity increases according to a level of pressure. The fore sensor member 115 may be coated on the first substrate 111 and/or the second substrate 113 through a printing process, or may be adhered to the first substrate 111 and/or the second substrate 113 through an adhesion process using an adhesive.

The substrate bonding member 117 may provide a gap space GS between the first and second substrates 111 and 113 and may bond the first substrate 111 to the second substrate 113. The substrate bonding member 117 may be an adhesive having cushion properties. The substrate bonding member 117 may act as a support that supports the first substrate 111 and the second substrate 113 with the gap space GS therebetween.

In addition, a lower insulation layer 117a may be formed in a contact portion of the first substrate 111 contacting a bottom of the substrate bonding member 117, and an upper insulation layer 117b may be formed in a contact portion of the second substrate 113 contacting a top of the substrate bonding member 117. The lower insulation layer 117a and the upper insulation layer 117b may electrically insulate the first routing line RL1 from the second routing line RL2.

The Touch Panel 110 May Further Include a Spacer 119.

The spacer 119 may be disposed between the first and second electrodes Rx and Tx facing each other and may maintain the gap space GS between the first and second substrates 111 and 113 or restore the first substrate 113, which is pressurized or bent by the force touch of the user, to an original position.

The touch driver 120 may be connected to the touch pad part TPP provided in the touch panel 110. That is, the touch driver 120 may be mounted on a touch flexible circuit film 130 adhered to the touch pad part TPP of the touch panel 110 and may be connected to the touch pad part TPP through the touch flexible circuit film 130. The touch flexible circuit film 130 may transfer a signal between the touch panel 110 and the touch driver 120 and may transfer a signal between the touch driver 120 and a host controller.

The touch driver 120 may be connected to the plurality of first electrodes Rx through the first routing line RL1 and may be connected to the plurality of second electrodes Tx through the second routing line RL2, via the touch flexible circuit film 130 and the touch pad part TPP. The touch driver 120 may sense the force touch from the touch panel 110 to generate touch force data, and may adjust a sensitivity of the touch force data, based on touch mode information set by the user. That is, the touch driver 120 may generate a touch driving pulse and may sequentially supply the touch driving pulse to the plurality of second electrodes Tx. Also, the touch driver 120 may sense a voltage, corresponding to a current which flows in each of the plurality of first electrodes Rx through the force sensor (e.g., the resistor Rm) formed in the force sensor member 115 by the force touch, to generate the touch force data and may adjust (determine) a sensitivity of the touch force data based on the touch mode information to supply the sensitivity-adjusted touch force data to the host controller.

Figure 3:
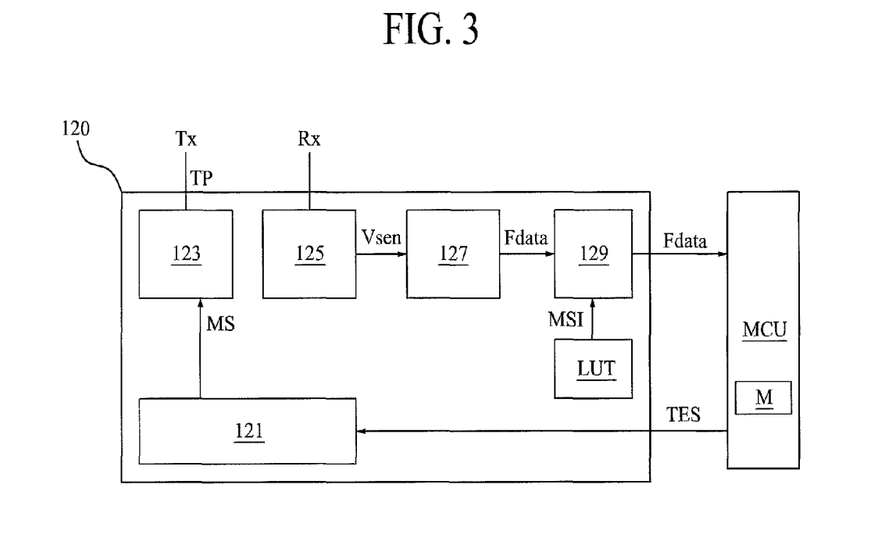
FIG. 3 is a block diagram illustrating a touch driver according to an embodiment of the present invention.
Figure 4:
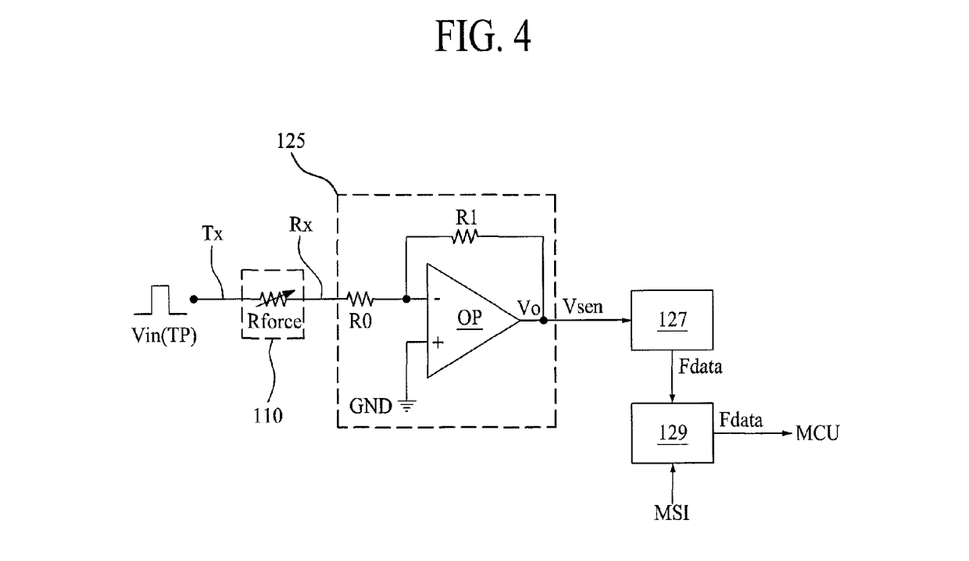
FIG. 4 is a diagram illustrating a sensing unit, an analog-to-digital converter, and a bit selector illustrated in FIG. 3.

FIG. 3 is a block diagram illustrating the touch driver 120 according to an embodiment of the present invention, and FIG. 4 is a diagram illustrating a sensing unit, an analog-to-digital converter, and a bit selector illustrated in FIG. 3.

Referring to FIGS. 1 to 4, the touch driver 120 according to an embodiment of the present invention may include a touch controller 121, a pulse supply unit 123, a look-up table LUT, a sensing unit 125, an analog-to-digital converter (ADC) 127, and a bit selector 129.

The touch controller 121 may control the touch driver 120 in response to a touch enable signal TES supplied from a host controller MCU.

The pulse supply unit 123 may generate a touch driving pulse TP having a certain frequency and a certain pulse width according to control by the touch controller 121 and may sequentially supply the touch driving pulse TP to the plurality of second electrodes Tx. For example, the pulse supply unit 123 may convert, through pulse width modulation, a clock signal generated from an internal clock generator to generate the touch driving pulse TP and may sequentially supply the touch driving pulse TP to the plurality of second electrodes Tx.

The look-up table LUT may store touch mode information MSI set by a user.

The touch mode information MSI may be set through a touch mode setting performed by the user, for adjusting a sensitivity of touch force data according to a force touch angle based on a force touch type of the user.

Figure 5A:
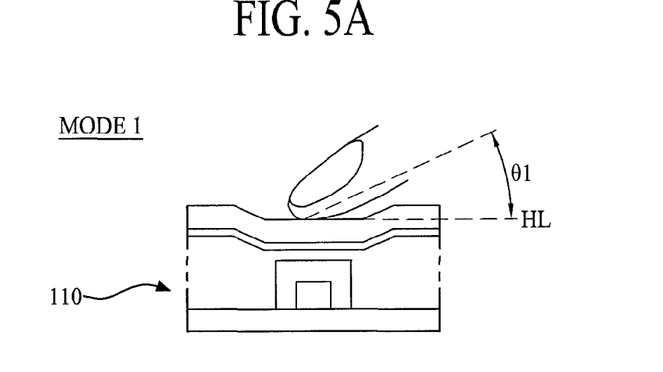
FIGS. 5A, 5B and 5C are diagrams illustrating first touch mode, second touch mode and third touch mode according to an embodiment of the present invention.
Figure 5B:
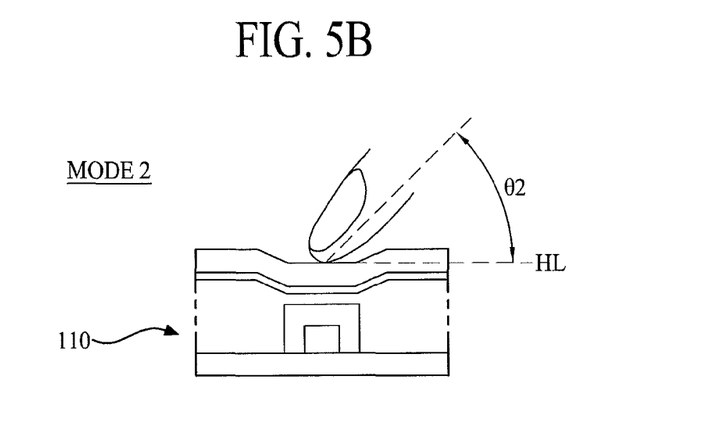
Figure 5C:
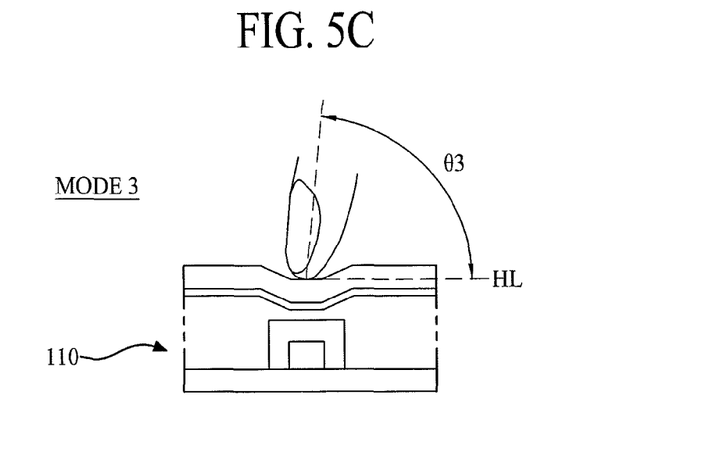

The touch mode information MSI according to an embodiment may correspond to one touch mode selected from among first to ith (where i is a natural number greater than or equal to two) touch modes which are respectively set based on the force touch angle with respect to the touch panel 110. For example, as illustrated in FIGS. 5A to 5C, the touch mode information MSI may correspond to one touch mode selected from among the first touch mode MODE1 set based on a first touch angle θ1 with respect to the touch panel 110, the second touch mode MODE2 set based on a second touch angle θ2 with respect to the touch panel 110, and the third touch mode MODE3 set based on a third touch angle θ3 with respect to the touch panel 110.

The first touch angle θ1, the second touch angle θ2 and the third touch angle θ3 may each be defined as an angle between a user finger (or a conductive object) and a horizontal line HL parallel to a top of the touch panel 110. The first touch angle θ1 may be defined as 0 degrees to 25 degrees, the second touch angle θ2 may be defined as an angle (for example, 26 degrees to 45 degrees) greater than the first touch angle θ1, and the third touch angle θ3 may be defined as an angle (for example, 46 degrees to 90 degrees) greater than the second touch angle θ2.

The first touch angle θ1 is for enhancing a force sensing sensitivity of a soft touch based on a relatively small force touch angle. The third touch angle θ3 is for enhancing a force sensing sensitivity of a strong touch based on a relatively large force touch angle. The second touch angle θ2 may be a normal force touch angle and is for recognizing a normal force touch between the soft touch and the strong touch.

Additionally, if a force touch type of the user is not set through a touch mode setting performed by the user, the touch mode information MSI may be stored as a normal force touch type of a user in the look-up table LUT to correspond to the second touch mode MODE2.

Referring again to FIGS. 1 to 4, the sensing unit 125 may be connected to the plurality of first electrodes Rx and may sense a voltage, corresponding to a current which flows in each of the plurality of first electrodes Rx through the resistor Rm formed in the force sensor member 115 by the force touch, to amplify and output the sensed voltage. Thus, the sensing unit 125 according to an embodiment may include an amplifier OP.

The amplifier OP may be an inverting amplifier and may include an inverting terminal (−) connected to a corresponding first electrode Rx through a reference resistor R0, a non-inverting terminal (+) connected to a ground GND, and an output terminal Vo connected to the ADC 127. Also, a first resistor R1 may be connected between the inverting terminal (−) and the output terminal Vo of the amplifier OP. The amplifier OP may amplify and output a voltage corresponding to a current which flows in the corresponding first electrodes Rx through the resistor Rm formed in the force sensor member 115 by the force touch as expressed by the following Equation (1):

$$V\text{sen} = -(R1/(R\text{force}+R0))V\text{in} \quad (1)$$

where Vsen denotes an output voltage of the amplifier OP, Rforce denotes a resistance value of the resistor Rm formed in the force sensor member 115 by the force touch, and Vin denotes an input voltage of the touch driving pulse TP applied to a corresponding second electrode Tx.

The ADC 127 may analog-to-digital convert the output signal Vsen of the sensing unit 125 (e.g., the amplifier OP) to generate N-bit (where N is a natural number greater than or equal to eight) digital sensing data Fdata.

Figure 6:
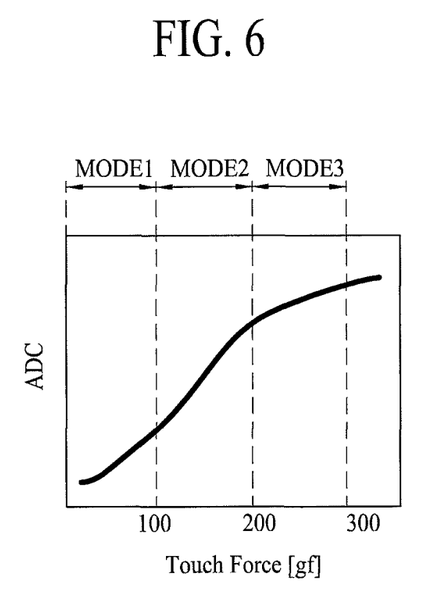
FIG. 6 is a graph showing an output value of an analog-to-digital converter with respect to a touch force based on a touch mode.

The bit selector 129, as illustrated in FIG. 6, may select and output the N-bit digital sensing data Fdata supplied from the ADC 127 according to one of the first touch mode MODE1, the second touch mode MODE2 and the third touch mode MODE3 corresponding to the touch mode information MSI, thereby adjusting a force sensing sensitivity according to a touch mode. That is, the bit selector 129 may select a bit group, corresponding to the touch mode information MSI from the look-up table LUT, as touch force data Fdata from among N bits of the digital sensing data Fdata supplied from the ADC 127 and may supply the touch force data Fdata to the host controller MCU.

For example, if the digital sensing data Fdata consists of 12 bits, the bit selector 129 may select a lower bit group as the touch force data Fdata from among the 12 bits of the digital sensing data Fdata according to the touch mode information MSI corresponding to the first touch mode MODE1, select an intermediate bit group as the touch force data Fdata from among the 12 bits of the digital sensing data Fdata according to the touch mode information MSI corresponding to the second touch mode MODE2, and select an upper bit group as the touch force data Fdata from among the 12 bits of the digital sensing data Fdata according to the touch mode information MSI corresponding to the third touch mode MODE3. Here, the lower bit group may be set as including lower 6 bits among the 12 bits of the digital sensing data Fdata, the intermediate bit group may be set as including intermediate 6 bits among the 12 bits of the digital sensing data Fdata, and the upper bit group may be set as including upper 6 bits among the 12 bits of the digital sensing data Fdata.

The touch driver 120 according to an embodiment of the present invention may select an output range of the touch force data Fdata according to the touch mode information MSI to adjust (or determine) a sensitivity of the touch force data Fdata according to a force touch type of the user, and thus, the host controller MCU accurately determines a force touch of the user even without using a complicated compensation algorithm (e.g., force touch sensitivity can be personalized for a given user by selecting the appropriate touch mode setting).

The host controller MCU may receive the touch force data Fdata transmitted from the touch driver 120, calculate a touch force level from the received touch force data Fdata by using a force level algorithm that models a resistance change rate of the resistance Rm formed in the force sensor member 115, and execute an application (for example, an unlock application, a shortcut application, and/or the like) associated with the calculated touch force level. Furthermore, the host controller MCU may model a position of the second electrode Tx, to which the touch driving pulse is applied at a touch force sensing time, and a position of the first electrode Rx, where a current flows through the resistance Rm, to calculate a touch position of the force touch and may execute an application associated with the calculated touch position. Also, the host controller MCU may execute an application associated with the calculated touch force level and touch position.

Figure 7:
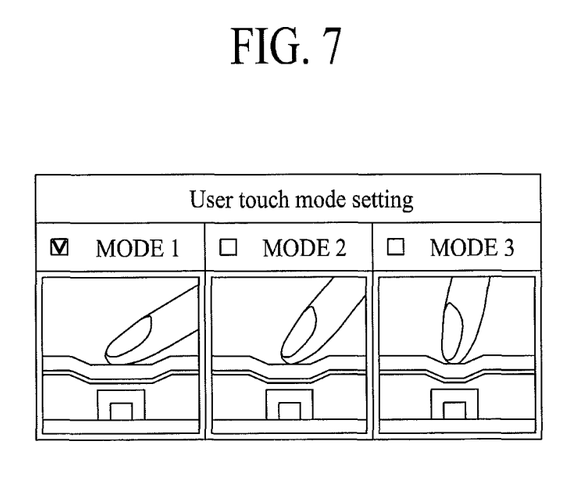
FIG. 7 is a diagram illustrating a user touch mode setting screen for setting a user touch mode, according to an embodiment of the present invention.

In addition, as illustrated in FIG. 7, the host controller MCU may set one touch mode, selected from among a plurality of touch modes (for example, the first touch mode MODE1, the second touch mode MODE2 and the third touch mode MODE3) by the user, as the touch mode information MSI through a user touch mode setting screen and may store the touch mode information MSI in the look-up table LUT of the touch driver 120. In this instance, if the user does not set the touch mode information MSI, the host controller MCU may set the second touch mode MODE2, which is the normal force touch type of the user, as the touch mode information MSI and may store the touch mode information MSI in the look-up table LUT of the touch driver 120. Here, the host controller MCU may not store the set touch mode information MSI in the look-up table LUT of the touch driver 120 but may store the touch mode information MSI in an internal memory M, and may supply the touch mode information MSI stored in the internal memory M to the bit selector 129 of the touch driver 120. In this instance, according to the present embodiment, the look-up table LUT of the touch driver 120 may be omitted.

Figure 8:
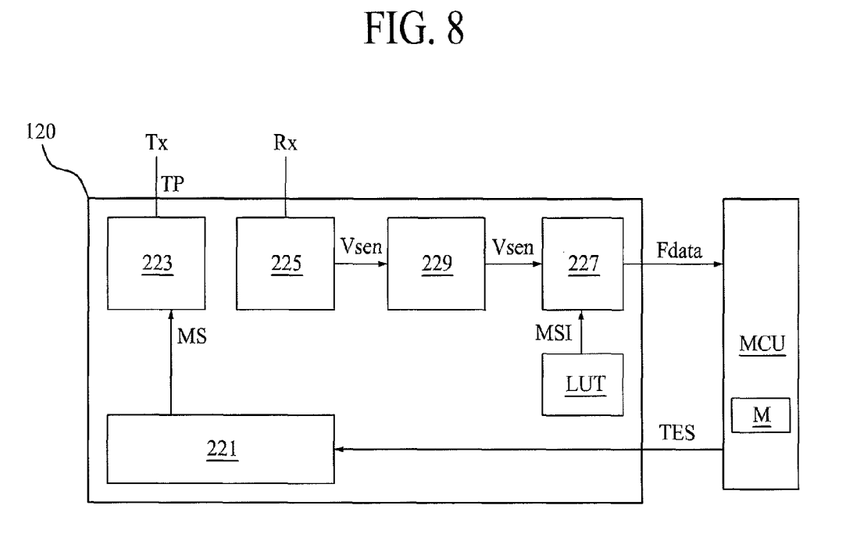
FIG. 8 is a block diagram illustrating a touch driver according to another embodiment of the present invention.
Figure 9:
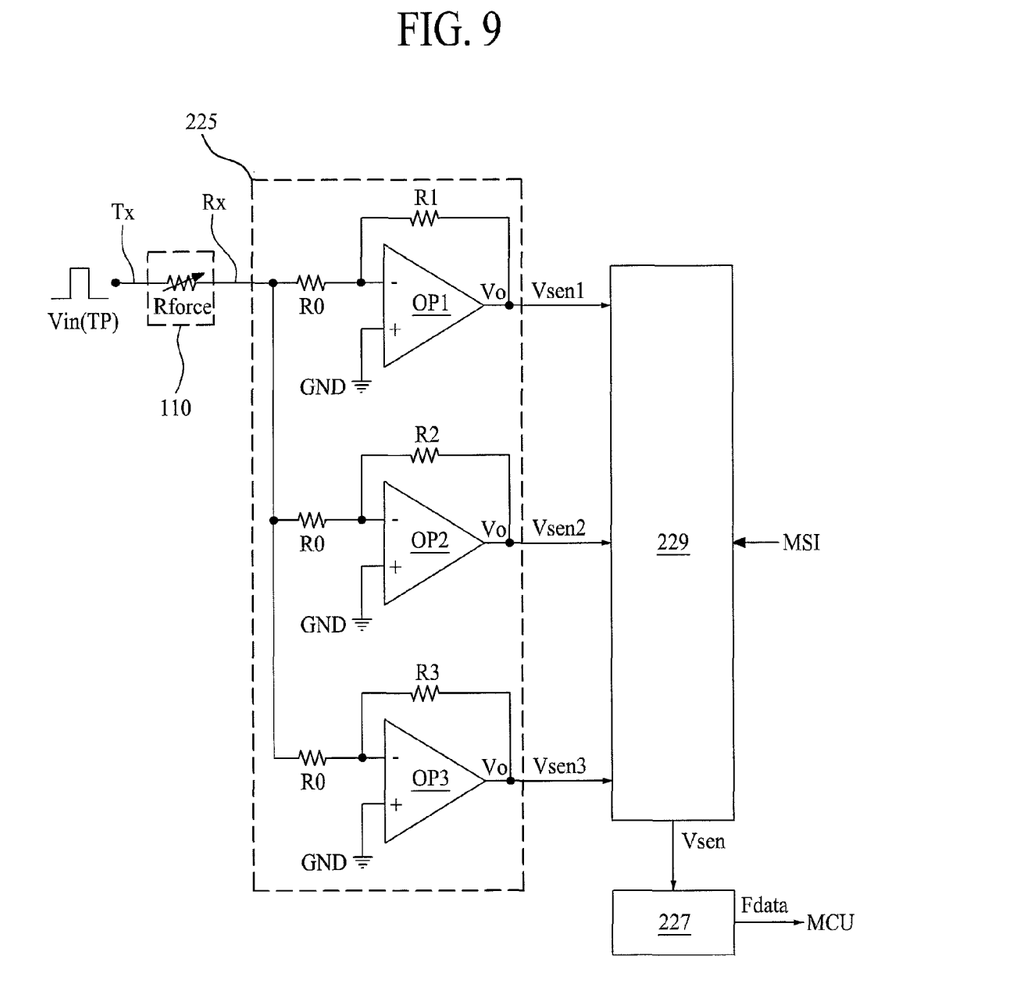
FIG. 9 is a diagram illustrating a sensing unit, a signal selector, and an analog-to-digital converter illustrated in FIG. 8.

FIG. 8 is a block diagram illustrating a touch driver 120 according to another embodiment of the present invention, and FIG. 9 is a diagram illustrating a sensing unit, a signal selector, and an analog-to-digital converter illustrated in FIG. 8.

Referring to FIGS. 8 and 9, the touch driver 120 according to another embodiment of the present invention may include a touch controller 221, a pulse supply unit 223, a look-up table LUT, a sensing unit 225, a signal selector 229, and an ADC 227.

The touch controller 221 may control the touch driver 120 in response to a touch enable signal TES supplied from a host controller MCU.

The pulse supply unit 223 may generate a touch driving pulse TP having a certain frequency and a certain pulse width according to control by the touch controller 221 and may sequentially supply the touch driving pulse TP to a plurality of second electrodes Tx.

The look-up table LUT, as described above, may store touch mode information MSI set by a user.

The sensing unit 225 may be connected to a plurality of first electrodes Rx and may sense a voltage corresponding to a current which flows in each of the plurality of first electrodes Rx through the resistor Rm formed in the force sensor member 115 by a force touch, amplify the voltage according to first to ith voltage amplification rates to generate first to ith sensing voltages, and simultaneously output the first to ith sensing voltages. In this instance, a jth (where j is a natural number among two to i) voltage amplification rate may be set to have a value greater than that of a kth (where k is a natural number of j−1) voltage amplification rate. Thus, the sensing unit 225 connected to each of the plurality of first electrodes Rx may include first to ith amplifiers. Hereinafter, the sensing unit 225 connected to each of the plurality of first electrodes Rx is assumed as including first amplifier OP1, second amplifier OP2 and third amplifier OP3 which are connected to one first electrode Rx in parallel.

The first amplifier OP1 may be an inverting amplifier and may include an inverting terminal (−) connected to a corresponding first electrode Rx through a reference resistor R0, a non-inverting terminal (+) connected to a ground GND, and an output terminal Vo connected to the signal selector 229. Also, a first resistor R1 may be connected between the inverting terminal (−) and the output terminal Vo of the first amplifier OP1. The first amplifier OP1 may amplify a voltage, corresponding to a current which flows in the corresponding first electrodes Rx through the resistor Rm formed in the force sensor member 115 by the force touch, according to the first voltage amplification rate to generate a first sensing voltage Vsen1 as expressed by the following Equation (2) and may output the first sensing voltage Vsen1 to the signal selector 229:

$$Vsen1 = -(R1/(Rforce+R0))Vin \qquad (2)$$

The second amplifier OP2 may be an inverting amplifier and may include an inverting terminal (−) connected to a corresponding first electrode Rx through a reference resistor R0, a non-inverting terminal (+) connected to a ground GND, and an output terminal Vo connected to the signal selector 229. Also, a second resistor R2 may be connected between the inverting terminal (−) and the output terminal Vo of the second amplifier OP2. Here, the second resistor R2 may have a resistance value greater than that of the first resistor R1 of the first amplifier OP1. The second amplifier OP2 may amplify a voltage, corresponding to a current which flows in the corresponding first electrodes Rx through the resistor Rm formed in the force sensor member 115 by the force touch, according to the second voltage amplification rate to generate a second sensing voltage Vsen2 as expressed by the following Equation (3) and may output the second sensing voltage Vsen2 to the signal selector 229:

$$Vsen2 = -(R2/(Rforce+R0))Vin \qquad (3)$$

The third amplifier OP3 may be an inverting amplifier and may include an inverting terminal (−) connected to a corresponding first electrode Rx through a reference resistor R0, a non-inverting terminal (+) connected to a ground GND, and an output terminal Vo connected to the signal selector 229. Also, a third resistor R3 may be connected between the inverting terminal (−) and the output terminal Vo of the third amplifier OP3. Here, the third resistor R3 may have a resistance value greater than that of the second resistor R2 of the second amplifier OP2. The third amplifier OP3 may amplify a voltage, corresponding to a current which flows in the corresponding first electrodes Rx through the resistor Rm formed in the force sensor member 115 by the force touch, according to the third voltage amplification rate to generate a third sensing voltage Vsen3 as expressed by the following Equation (4) and may output the third sensing voltage Vsen3 to the signal selector 229:

$$Vsen3 = -(R3/(Rforce+R0))Vin \qquad (4)$$

The signal selector 229 may select a sensing voltage, corresponding to the touch mode information MSI from the look-up table LUT, from among the first to third sensing voltages Vsen1 to Vsen3 which are simultaneously and respectively supplied from the first sensing voltages Vsen1, the second sensing voltage Vsen2 and the third amplifier OP3 of the sensing unit 225, and may output the selected sensing voltage to the ADC 227.

For example, the signal selector 229 may select the first sensing voltage Vsen1 according to the touch mode information MSI corresponding to the first touch mode MODE1, select the second sensing voltage Vsen2 according to the touch mode information MSI corresponding to the second touch mode MODE2, and select the third sensing voltage Vsen3 according to the touch mode information MSI corresponding to the third touch mode MODE3, from among the first amplifier OP1, the second amplifier OP2 and the third amplifier OP3.

The ADC 227 may analog-to-digital convert the sensing voltage selected by the signal selector 229 to generate N-bit (where N is a natural number greater than or equal to eight) digital sensing data Fdata and may supply the N-bit digital sensing data Fdata to the host controller MCU.

The touch driver 120 according to another embodiment of the present invention may amplify a sensing signal based on a force touch at different voltage amplification rates to generate a plurality of sensing voltages and may select a sensing voltage corresponding to the touch mode information MSI from among a plurality of sensing voltages to adjust (or determine) a sensitivity of the touch force data Fdata according to a force touch type of a user, and thus, the host controller MCU accurately determines a force touch of the user even without using a complicated compensation algorithm.

Figure 10:
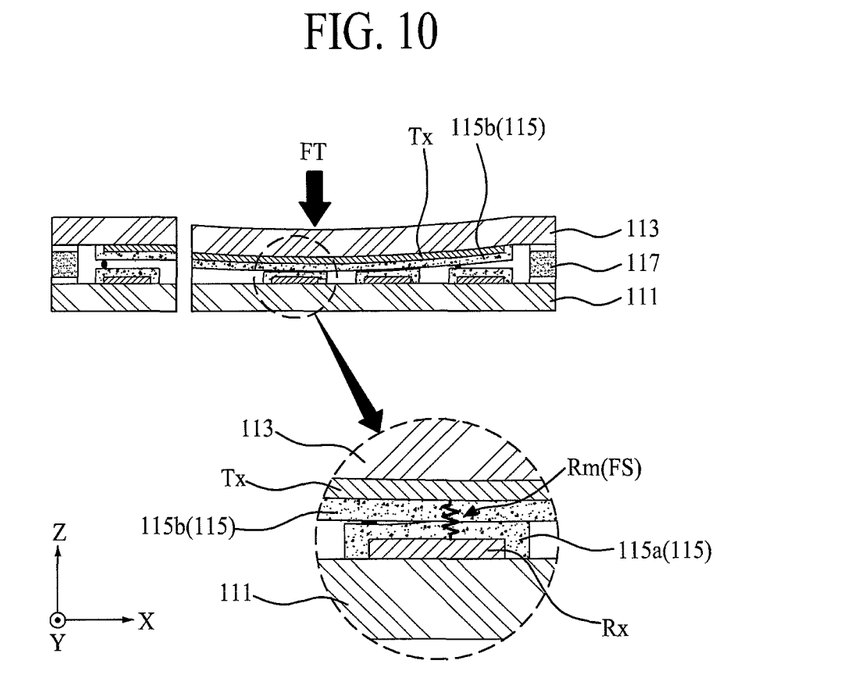
FIG. 10 is a diagram illustrating a force touch sensing operation in an apparatus for driving touch panel, according to an embodiment of the present invention.

FIG. 10 is a diagram illustrating a force touch sensing operation in an apparatus for driving touch panel, according to an embodiment of the present invention. Hereinafter, the force touch sensing operation will be described with reference to FIGS. 1 and 10.

The touch driver 120 may generate a touch driving pulse and may sequentially supply the touch driving pulse to a plurality of second electrodes Tx. At this time, when a second elastic resistor pattern 115b covering the second electrode Tx physically contacts a first elastic resistor pattern 115a covering the first electrode Rx according to a force touch FT applied to the touch panel 110, a resistor Rm may be formed in a force sensor member 115 between the first and second electrodes Rx and Tx facing each other, and a current based on the touch driving pulse supplied to the second electrode Tx through the resistor Rm may flow to a corresponding first electrode Rx.

According to an embodiment, the touch driver 120 may amplify a voltage, corresponding to a current which flows in the resistor Rm through the first electrode Rx, to generate a sensing voltage, may analog-to-digital convert the sensing voltage to generate N-bit touch force data, may select a bit group, corresponding to touch mode information, as touch force data from among N bits of the digital sensing data, and may supply the touch force data to the host controller MCU.

According to another embodiment, the touch driver 120 may amplify a voltage, corresponding to a current which flows in the resistor Rm through the first electrode Rx, according to different voltage amplification rates to generate a plurality of sensing voltages, may select one sensing voltage corresponding to the touch mode information from among the plurality of sensing voltages, may analog-to-digital convert the selected sensing voltage to generate N-bit touch force data, and may supply the touch force data to the host controller MCU.

The host controller MCU may calculate a touch force level from the touch force data by using the force level algorithm that models a resistance change rate of the resistance Rm formed in the force sensor member 115, and may execute an application corresponding to the calculated touch force level.

As described above, the touch panel driving apparatus according to an embodiment of the present invention may adjust a sensitivity of touch force data according to touch mode information set by a user to compensate for a loss of sensitivity which occurs in an operation of transferring a touch force based on a touch type of the user, thereby more accurately sensing a force touch.

Figure 11:
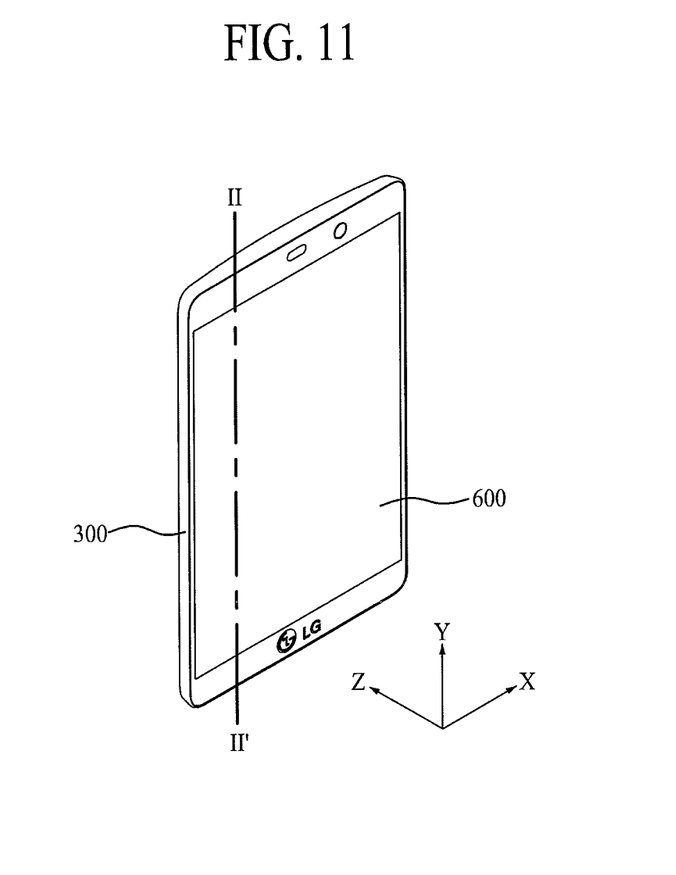
FIG. 11 is a perspective view illustrating an electronic device according to an embodiment of the present invention.
Figure 12:
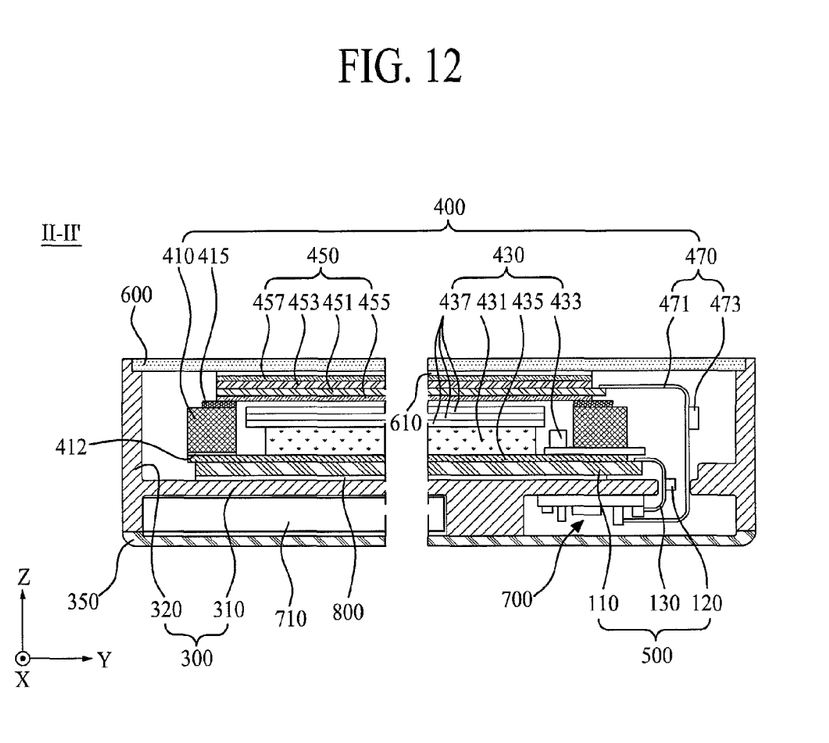
FIG. 12 is a cross-sectional view taken along line II-IP of FIG. 11.

FIG. 11 is a perspective view illustrating an electronic device according to an embodiment of the present invention, and FIG. 12 is a cross-sectional view taken along line II-IP of FIG. 11.

Referring to FIGS. 11 and 12, the electronic device according to an embodiment of the present invention may include a housing 300, an image display module 400, a force sensor unit 500, a cover window 600, and a driving system circuit unit 700.

The housing 300 may include an accommodating space which is defined by a bottom 310 and a housing side wall 320. The housing 300 may have a box shape with a top opened. The housing 300 may be formed of a metal material or a plastic material. Here, the housing 300 may be formed of a metal material (for example, aluminum (Al), invar, magnesium (Mg), or the like) for effectively dissipating heat which occurs in the image display module 400.

The accommodating space may be disposed on the bottom 310 of the housing 300 and may accommodate the image display module 400.

At least one system accommodating space may be provided in a rear surface of the housing 300. The system driving circuit unit 700, a battery 710 for supplying a driving power, a communication module, a power circuit, a memory, and/or the like which are included in the electronic device may be accommodated into the system accommodating space. The rear surface of the housing 300 may be detachably covered by a rear cover 350.

The image display module 400 may display an image corresponding to an image signal supplied from the system driving circuit unit 700 or may detect a position touched by a user. That is, in a display mode, the image display module 400 may display the image corresponding to the image signal supplied from the system driving circuit unit 700. Also, in a touch sensing mode, the image display module 400 may detect the position touched by the user and may supply a detection signal, corresponding to the touched position, to the system driving circuit unit 700.

The image display module 400 according to an embodiment may include a guide frame 410, a backlight unit 430, a liquid crystal display panel 450, and a panel driver 470.

The guide frame 410 may be provided in a tetragonal belt shape including a hollow portion and may support a rear edge of the liquid crystal display panel 450. Also, the guide frame 410 may surround a side surface of the backlight unit 430, thereby minimizing a movement of the backlight unit 430.

The backlight unit 430 may include a light guide plate 431, a light source unit 433, a reflective sheet 435, and an optical sheet part 437.

The light guide plate 431 may include a light incident part provided on at least one side surface thereof and may have a tetragonal plate shape.

The light source unit 433 may irradiate light, emitted from each of a plurality of light emitting diodes (LEDs) which are disposed on a side surface of the light guide plate 431 to face the light incident part of the light guide plate 431, onto the light incident part of the light guide plate 431.

The reflective sheet 435 may be disposed on the bottom 310 of the housing 300 and may cover a rear surface of the light guide plate 431. The reflective sheet 435 may reflect light, which is incident through a bottom of the light guide plate 431, toward the inside of the light guide plate 431, thereby minimizing a loss of the light. Also, the reflective sheet 435 may dissipate heat, occurring in the light guide plate 431 due to heat and light which are generated when the light source unit 433 is driven, toward the housing 300.

In addition, the reflective sheet 435 may support the guide frame 410. Thus, the reflective sheet 435 may further include an extension area that extends from each of side surfaces of the reflective sheet 435 to overlap the bottom of the guide frame 410, and the extension area of the reflective sheet 435 may be coupled to the bottom of the guide frame 410 by an adhesive 412.

The optical sheet part 437 may be disposed on the light guide plate 431 to enhance the luminance characteristic of light irradiated from the light guide plate 431. For example, the optical sheet part 437 may include a lower diffusive sheet, a prism sheet, and an upper prism sheet, but is not limited thereto. In other embodiments, the optical sheet part 437 may include a stacked combination of two or more elements selected from a diffusive sheet, a prism sheet, a dual brightness enhancement film, and a lenticular sheet.

The liquid crystal display panel 450 may include a lower substrate 451 and an upper substrate 453 which are opposite-bonded to each other with a liquid crystal layer therebetween, and may display a certain image by using light irradiated from the backlight unit 430.

The lower substrate 451 may be a TFT array substrate and may include a plurality of pixels respectively provided in a plurality of pixel areas where a plurality of gate lines intersect a plurality of data lines. Each of the plurality of pixels may include a TFT connected to a corresponding gate line and a corresponding data line, a pixel electrode connected to the TFT, and a common electrode which is provided adjacent to the pixel electrode and receives a common voltage.

A pad part connected to each of a plurality of signal lines may be provided in a lower edge of the lower substrate 451 and may be connected to the panel driving circuit unit 470. Also, a gate driving circuit for supplying a gate signal to the gate lines of the liquid crystal display panel 450 may be provided on a left and/or right edge of the lower substrate 651 simultaneously with a process of manufacturing the TFT of each pixel.

The upper substrate 353 may include a pixel defining pattern, which defines an opening area overlapping each pixel area provided in the lower substrate 451, and a color filter which is provided in the opening area. The upper substrate 453 may be opposite-bonded to the lower substrate 451 by a sealant with the liquid crystal layer therebetween and may cover all of the lower substrate 451 except the pad part of the lower substrate 451.

A lower polarizing member 455 having a first polarization axis may be attached to the rear surface of the lower substrate 451, and an upper polarizing member 457 having a second polarization axis intersecting the first polarization axis may be attached to a front surface of the upper substrate 453.

In the liquid crystal display panel 450, the common electrode may be used as a touch sensing electrode in the touch sensing mode, and in the display mode, the common electrode may be used as a liquid crystal driving electrode along with the pixel electrode. That is, the liquid crystal display panel 450 may be an in-cell touch type liquid crystal display panel, and in more detail, the liquid crystal display panel 650 may be a self-capacitance in-cell touch type liquid crystal display panel. For example, the in-cell touch type liquid crystal display panel may be a liquid crystal display panel of a liquid crystal display device integrated with touch sensor disclosed in Korean Patent Publication No. 10-2013-0015584, but is not limited thereto.

A rear edge of the liquid crystal display panel 450 may be coupled to a top of the guide frame 410 by a panel adhesive member 415. Here, the panel adhesive member 415 may be a double-sided tape, a thermocurable resin, a photocurable resin, a double-sided adhesive foam pad, or the like.

The panel driving circuit unit 470 may be connected to the pad part provided on the lower substrate 451, and each pixel of the liquid crystal display panel 450 may be driven, thereby displaying a certain color image on the liquid crystal display panel 450. The panel driving circuit unit 470 according to an embodiment may include a data flexible circuit film 471 and a driving integrated circuit (IC) 473.

The data flexible circuit film 471 may be connected to the pad part provided on the lower substrate 451 and may be connected to the system driving circuit unit 700.

In the display mode, the driving IC 473 may drive each pixel by using image data and a control signal which are supplied from the system driving circuit unit 700. Also, in the touch mode, the driving IC 473 may supply a touch driving pulse to the common electrode through a touch driving line, may sense through the touch driving line a capacitance change of the common electrode caused by a user touch to generate touch position data, and may supply the touch position data to the system driving circuit unit 700.

The force sensor unit 500 may include a touch panel 110 and a touch driver 120 mounted on a touch flexible circuit film 130 connected to the touch panel 110. The force sensor unit 500 has the same configuration as that of the touch panel driving apparatus 100 described above with reference to FIGS. 1 to 10, and thus, its detailed description is not repeated.

The force sensor unit 500 may be disposed between the bottom 310 of the housing 300 and the image display module 400 and may sense a force touch of a user applied to the electronic device. In more detail, the touch panel 110 of the force sensor unit 500 may be disposed between the bottom 310 of the housing 300 and the reflective sheet 435 of the backlight unit 430. The touch panel 310 may act as a heat transfer medium that transfers heat, occurring in the light source unit 433 of the backlight unit 435, to the housing 300. That is, the touch panel 310 may disperse heat remaining in the electronic device, thereby preventing an image quality error from occurring due to heat which occurs in the light source unit 433. In this instance, heat of the reflective sheet 435 may be dissipated to the housing 300 through a heat transfer path which passes through a contact portion of the touch panel 110 physically contacting the reflective sheet 435 and the housing 300, and simultaneously, may be dissipated to the housing 300 through heat radiation of the touch panel 110.

In addition, the electronic device according to an embodiment of the present invention may further include a heat dissipating member 800 for increasing the dissipation efficiency of the touch panel 110.

The heat dissipating member 800 according to an embodiment may be disposed between the bottom 310 of the housing 300 and the touch panel 110. The heat dissipating member 800 according to an embodiment may be adhered to the bottom 310 of the housing 300 and the touch panel 110 by an optical adhesive member, for effectively dissipating heat of the reflective sheet 435. Here, the optical adhesive member may be an optical clear adhesive (OCA), an optical clear resin (OCR), or the like. The heat dissipating member 800 according to an embodiment may be a heat dissipating sheet including a material (for example, carbon fiber, acrylic elastomer, graphite, silicon/ceramic, or the like) which is good in heat resistance and heat dissipation performance. Particularly, the heat dissipating member 800 may be a heat dissipating sheet including graphite.

The cover window 600 may cover a whole front surface of the liquid crystal display panel 450 and may be supported by the housing side wall 310 of the housing 300. In this instance, the cover window 600 may be adhered to the whole front surface of the liquid crystal display panel 450 by a transparent adhesive member 610 (for example, an OCA, an OCR, or the like), thereby protecting the liquid crystal display panel 450 from an external impact. The cover window 600 may be formed of tempered glass, transparent plastic, a transparent film, or the like.

The driving system circuit unit 700 may include a host controller for controlling driving of each of the panel driving circuit unit 470 and the touch driver 120. Also, the host controller may calculate a touch force level based on force touch data supplied from the touch driver 120 and may execute an application corresponding to the calculated touch force level. Also, the host controller may calculate a touch position, based on position touch data supplied from the panel driving circuit unit 470 and may execute an application corresponding to the calculated touch position.

As described above, the electronic device according to an embodiment of the present invention may include the touch panel driving apparatus according to an embodiment of the present invention. Therefore, the electronic device may adjust a sensitivity of touch force data according to touch mode information set by a user to compensate for a loss of sensitivity which occurs in an operation of transferring a touch force based on a touch type of the user, thereby more accurately sensing a force touch.

Figure 13:
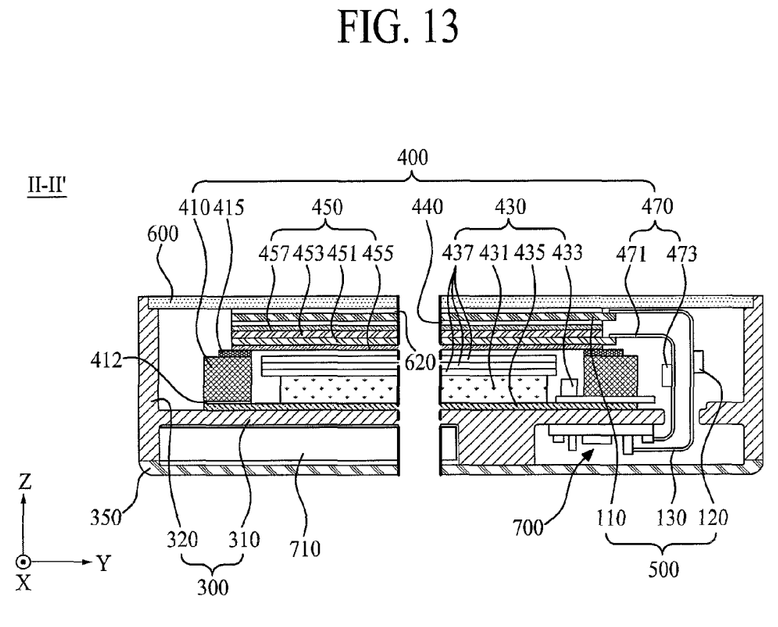
FIG. 13 is another cross-sectional view taken along line II-IP of FIG. 11.

In addition, in FIG. 12, the force sensor unit 500 is illustrated as being disposed between the image display module 400 and the bottom 310 of the housing 300, but is not limited thereto. In other embodiments, as illustrated in FIG. 13, the force sensor unit 500 may be disposed between the image display module 400 and the cover window 600, and in this instance, the force sensor unit 500 may be disposed closer to the cover window 600, thereby enhancing a force sensing sensitivity. The touch panel 110 of the force sensor unit 500 may be adhered to the whole front surface of the liquid crystal display panel 450 by a lower transparent adhesive member 440, and moreover, may be adhered to a bottom of the cover window 600 by an upper transparent adhesive member 620. Here, the lower transparent adhesive member 440 and the upper transparent adhesive member 620 may each be formed of an OCA, an OCR, or the like.

In FIGS. 11 to 13, the electronic device according to an embodiment of the present invention is illustrated as a smartphone including the liquid crystal display panel 450, but is not limited thereto. In other embodiments, the electronic device according to an embodiment of the present invention may be one of an electronic notebook, an e-book, a portable multimedia player (PMP), a navigation device, an ultra-mobile personal computer (UMPC), a mobile phone, a smartphone, a tablet PC, a watch phone, a mobile communication terminal, a televisions (TV), a notebook computer, and a monitor which includes a liquid crystal display panel or an organic light emitting display panel.

As described above, according to the embodiments of the present invention, a force sensing sensitivity may be adjusted based on a force touch type of a user, and thus, a force touch of a user is accurately determined.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for driving a touch panel, the apparatus comprising:
    a touch panel configured to sense a force touch of a user input; and
    a touch driver configured to sense the force touch from the touch panel and generate touch force data,
    wherein the touch driver adjusts a sensitivity of the force touch, based on touch mode information set by the user, and
    wherein the touch mode information corresponds to one touch mode selected from among a first touch mode, a second touch mode and a third touch mode which are respectively set based on a first touch angle with respect to the touch panel, a second touch angle greater than the first touch angle, and a third touch angle greater than the second touch angle.

2. The apparatus of claim 1, wherein the touch panel comprises:
    a first substrate including a first electrode;
    a second substrate including a second electrode facing and intersecting the first electrode; and
    a force sensor member provided between the first electrode and the second electrode, the force sensor member forming a resistor between the first and second electrodes based on the force touch of the user.

3. The apparatus of claim 2, wherein the touch driver comprises:
    a sensing unit including an amplifier connected to the first electrode, the sensing unit configured to sense, a voltage corresponding to a current which flows in the first electrode through the resistor, and amplify and simultaneously output the sensed voltage;
    an analog-to-digital converter configured to convert an output signal of the amplifier to N-bit digital sensing data, wherein N is a natural number greater than or equal to eight; and
    a bit selector configured to select a bit group, selected from among N bits of the digital sensing data, as the touch force data according to the touch mode information and output the touch force data.

4. The apparatus of claim 3, wherein the bit selector selects a lower bit group from among the N bits of the digital sensing data according to the first touch mode and outputs the lower bit group as the touch force data,
    wherein the bit selector selects an intermediate bit group from among the N bits of the digital sensing data according to the second touch mode and outputs the intermediate bit group as the touch force data, and
    wherein the bit selector selects an upper bit group from among the N bits of the digital sensing data according to the third touch mode and outputs the upper bit group as the touch force data.

5. The apparatus of claim 2, wherein the touch driver comprises:
    a sensing unit including first to ith amplifiers connected to the first electrode in parallel, the sensing unit configured to sense a voltage, corresponding to a current which flows in the first electrode through the resistor, and amplify and simultaneously output the sensed voltage according to different voltage amplification rates;
    a signal selector configured to select one output signal from among output signals of the first to ith amplifiers; and
    an analog-to-digital converter analog-to-digital converting the one output signal of a corresponding amplifier supplied from the signal selector to generate the touch force data.

6. The apparatus of claim 5, wherein a jth amplifier has a voltage amplification rate higher than a voltage amplification rate of a kth amplifier, wherein j is a natural number among two to i, and k is a natural number of j−1.

7. The apparatus of claim 6, wherein the sensing unit comprises the first amplifier, a second amplifier and a third amplifier, and
    wherein the signal selector selects an output signal of the first amplifier according to the first touch mode, an output signal of the second amplifier according to the second touch mode, and an output signal of the third amplifier according to the third touch mode.

8. The apparatus of claim 1, wherein the touch driver further comprises a look-up table storing touch mode information set by the user.

9. An electronic device comprising:
    a housing including an accommodating space defined by a bottom and a side wall thereof;
    an image display module disposed in the accommodating space;
    a force sensor unit overlapping the image display module;
    a cover window covering the image display module, the cover window being supported by the side wall of the housing; and
    a driving system circuit unit including a host controller connected to the force sensor unit to control the image display module and the force sensor unit,
    wherein the force sensor unit includes a touch panel configured to sense a force touch of a user, and a touch driver configured to sense the force touch from the touch panel and generate touch force data, and
    wherein the touch driver adjusts a sensitivity of the force touch, based on touch mode information set by the user, and
    wherein the touch mode information corresponds to one touch mode selected from among a first touch mode, a second touch mode and a third touch mode which are respectively set based on a first touch angle with respect to the touch panel, a second touch angle greater than the first touch angle, and a third touch angle greater than the second touch angle.

10. The electronic device of claim 9, wherein the touch panel is disposed between the bottom of the housing and the image display module.

11. The electronic device of claim 10, further comprising: a heat dissipating member disposed between the touch panel and the bottom of the housing.

12. The electronic device of claim 9, wherein the touch panel is disposed between the image display module and the cover window.

13. The electronic device of claim 9, wherein the host controller stores the touch mode information, set by the user, in a storage unit and supplies the touch mode information stored in the storage unit to the touch driver.

14. The electronic device of claim 9, wherein the touch panel comprises:
a first substrate including a first electrode;
a second substrate including a second electrode facing and intersecting the first electrode; and
a force sensor member provided between the first electrode and the second electrode, the force sensor member forming a resistor between the first and second electrodes based on the force touch of the user.

15. The electronic device of claim 14, wherein the touch driver comprises:
a sensing unit including an amplifier connected to the first electrode, the sensing unit configured to sense, a voltage corresponding to a current which flows in the first electrode through the resistor, and amplify and simultaneously output the sensed voltage;
an analog-to-digital converter configured to convert an output signal of the amplifier to N-bit digital sensing data, wherein N is a natural number greater than or equal to eight; and
a bit selector configured to select a bit group, selected from among N bits of the digital sensing data, as the touch force data according to the touch mode information and output the touch force data.

16. A display device comprising:
a touch screen configured to display an image; and
a controller configured to:
receive a user input,
select a force touch sensitivity mode among a plurality of force touch sensitivity modes based on the user input,
sense a force of a touch input applied to the touch screen, and
generate touch force data for the touch input based on the selected force touch sensitivity mode,
wherein the plurality of force touch sensitivity modes includes a soft touch mode, a normal touch mode, and a strong touch mode, and
wherein the soft touch mode corresponds to a first touch angle with respect to the touch panel, the normal touch mode corresponds to a second touch angle greater than the first touch angle, and the strong touch mode corresponds to a third touch angle greater than the second touch angle.

17. The display device of claim 16, wherein the soft touch mode corresponds to the first touch angle between 0 and 25 degrees with respect to a horizontal line parallel to a top of the touch screen, the normal touch mode corresponds to the second touch angle between 26 and 45 degrees with respect to the horizontal line, and the strong touch mode corresponds to the third touch angle between 46 and 90 degrees with respect to the horizontal line.

18. The display device of claim 16, wherein the controller is further configured to:
amplify a voltage corresponding to the sensed touch input with a first amplification rate when the soft touch mode is selected by the user input,
amplify the voltage with a second amplification rate when the normal touch mode is selected by the user input, and
amplify the voltage with a third amplification rate when the strong touch mode is selected by the user input,
wherein the force touch data is generated based on amplifying the voltage corresponding to the sensed touch input according to the selected force sensitivity mode.

19. The display device of claim 16, wherein the controller is further configured to: adjust the touch force data with a value stored in a look-up table based on the selected force sensitivity mode.

* * * * *